(12) United States Patent
Chen

(10) Patent No.: US 7,122,987 B2
(45) Date of Patent: Oct. 17, 2006

(54) SAFETY GARAGE DOOR

(75) Inventor: Duke Chen, Hsi-Chih (TW)

(73) Assignee: Equus Inc., Taipei (TW)

( * ) Notice: Subject to any disclaimer, the term of this patent is extended or adjusted under 35 U.S.C. 154(b) by 0 days.

(21) Appl. No.: 11/243,990

(22) Filed: Oct. 6, 2005

(65) Prior Publication Data

US 2006/0028163 A1 Feb. 9, 2006

Related U.S. Application Data

(63) Continuation-in-part of application No. 10/780,755, filed on Feb. 19, 2004, now abandoned.

(51) Int. Cl.
*H02P 7/00* (2006.01)

(52) U.S. Cl. ............ 318/468; 318/480; 318/256; 318/257; 49/26; 49/28

(58) Field of Classification Search ............ 318/468, 318/480, 256, 257; 49/26, 28
See application file for complete search history.

(56) References Cited

U.S. PATENT DOCUMENTS

| | | | |
|---|---|---|---|
| 5,036,899 A * | 8/1991 | Mullet | 160/189 |
| 6,118,243 A * | 9/2000 | Reed et al. | 318/468 |
| 2003/0112121 A1* | 6/2003 | Wilson | 340/5.61 |

* cited by examiner

*Primary Examiner*—Rita Leykin

(57) ABSTRACT

A safety garage door apparatus includes a garage door, two tracks, a controller, a linking device and a detecting device. Two tracks are installed on two sides of the garage door, respectively. The controller includes a motor, a driving device connected to the motor, and a microprocessor. The linking device includes a rail, a rack slidably mounted in the rail, and a linkage with one end connected to the rack and the other end connected to the garage door. The rack is connected with the driving device. The detecting device is mounted in the controller to continually detect a location of the rack so that a moving speed of the rack is determined by the microprocessor to compare with a predetermined rate to determined whether an operation of opening or closing the garage door needs to be stopped or reversed, or a maintenance of the garage door apparatus is needed.

10 Claims, 4 Drawing Sheets

SAFETY GARAGE DOOR

RELATED APPLICATIONS

This application is a continuation-in-part of U.S. patent application Ser. No. 10/780,755, filed on Feb. 19, 2004 now abandoned.

BACKGROUND OF THE INVENTION

The present invention relates to a garage door having precise control for opening and closing and prompt reminder when maintenance is needed so that the safety of operation can be improved.

Please refer to FIG. 1. A garage door apparatus typically has two tracks 2a on both sides of a garage door 1a, respectively, so that the garage door 1a can move along the tracks 2a through rollers. Above the garage door 1a, there are a linking device 4a and a controller 3a. The linking device 4a includes a rail 41a with one end fixed on the wall and the other end connected to the controller, a rack 42a slidably attached to the rail 41 and a linkage 43a with one end connected to the garage door 1a and the other end connected to the rack 42a Accordingly, after the controller 3a receives user's command, the garage door can be opened or closed.

In order to prevent accidents, such as closing garage door 1a to injure people, usually a detecting device 5a that includes a single-beam transmitter unit 51a and a receiver unit 52a is installed near the ground at two sides of the garage door 1a, respectively. An electric wire 6a along the periphery of the garage door 1a connects the detecting device 5a and the controller 3a Thus, when an obstacle appears on the path to block the emitting beam at closing garage door 1a, the controller 3a can respond immediately to reverse or stop the operation of the garage door 1a to assure the safety.

Besides, the maintenance on garage door apparatus is usually carried out according to an estimate period of usage or a predetermined schedule. However, this may not assure a timely service when maintenance is actually needed according to the machine condition. Therefore, conventional method fails to work as a criterion to determine whether a required maintenance is due. Consequently, it may have safety concerns in use.

Altogether, the conventional garage door apparatus has disadvantages as follows.

1. The detecting device utilizes a single horizontal beam, so it only detects the obstacle at a certain horizon level. Thus, when it fails to detect the obstacle on other situations, a detection error will happen and an accident could happen. This design cannot assure safety operation.
2. The estimated or predetermined maintenance schedule fails to work properly to provide timely service. Therefore, safety concerns of use are existed.
3. The installation of the detecting device and the controller connected by the exposed wire is lousy and inconvenience. In addition, the exposed wire is easily damaged to cause maintenance problem and interruption of signal transmission. This aggravates the difficulty in safety control. On the other hand, exposed wiring affects aesthetics and tidiness for the garage.

Although U.S. Pat. No. 6,326,751 discloses a garage door with moving speed detection, its design is different from Applicant's invention and it cannot provide a prompt reminder for the maintenance to enhance the safety and prolong the life.

SUMMARY OF THE INVENTION

A safety garage door that provides precise control and timely maintenance is provided. As such, the accident of operating the garage door can be prevented and the maintenance can be promptly reminded to assure enhanced safety operation.

Accordingly, the safety garage door apparatus includes a garage door, two tracks, a controller, a linking device and a detecting device. Two tracks are installed on two sides of the garage door, respectively. The controller is fixedly installed above the garage door, including a motor, a driving device connected to the motor, and a microprocessor. The linking device includes a rail, a rack slidably mounted in the rail, and a linkage with one end connected to the rack and the other end connected to the garage door. The rack is connected with the driving device. The detecting device is mounted in the controller to continually detect a location of the rack so that a moving speed of the rack is determined by the microprocessor to compare with a predetermined rate to determined whether an operation of opening or closing the garage door needs to be stopped or reversed, or a maintenance of the garage door apparatus is needed.

The objective, features and benefits for the invention are described in the following. It is hoped that the examiners will get thorough understanding through the explanation below.

DETAILED DESCRIPTION OF THE INVENTION

Figure 1:
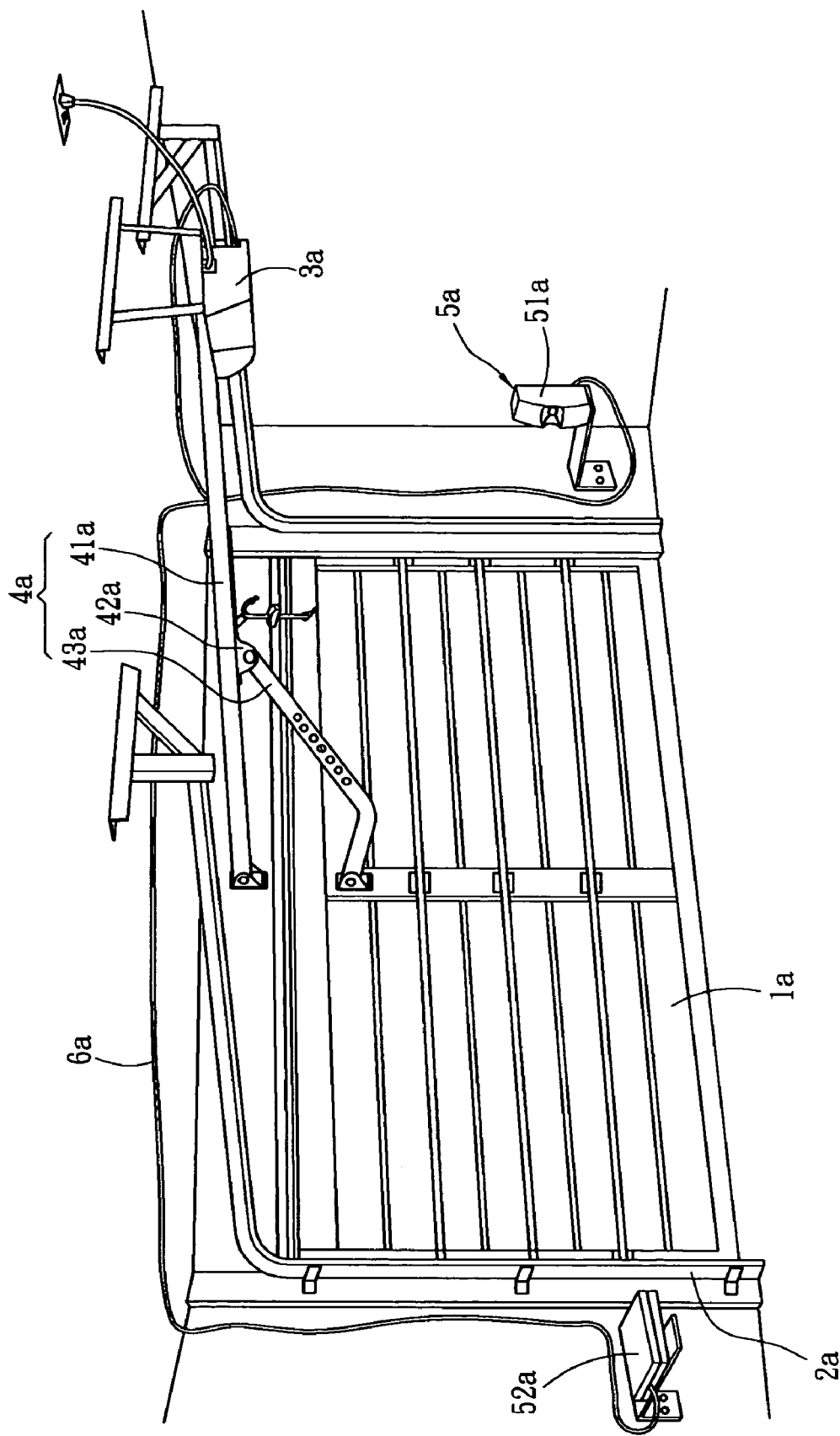
FIG. 1 is a perspective view for the conventional garage door apparatus.
Figure 2:
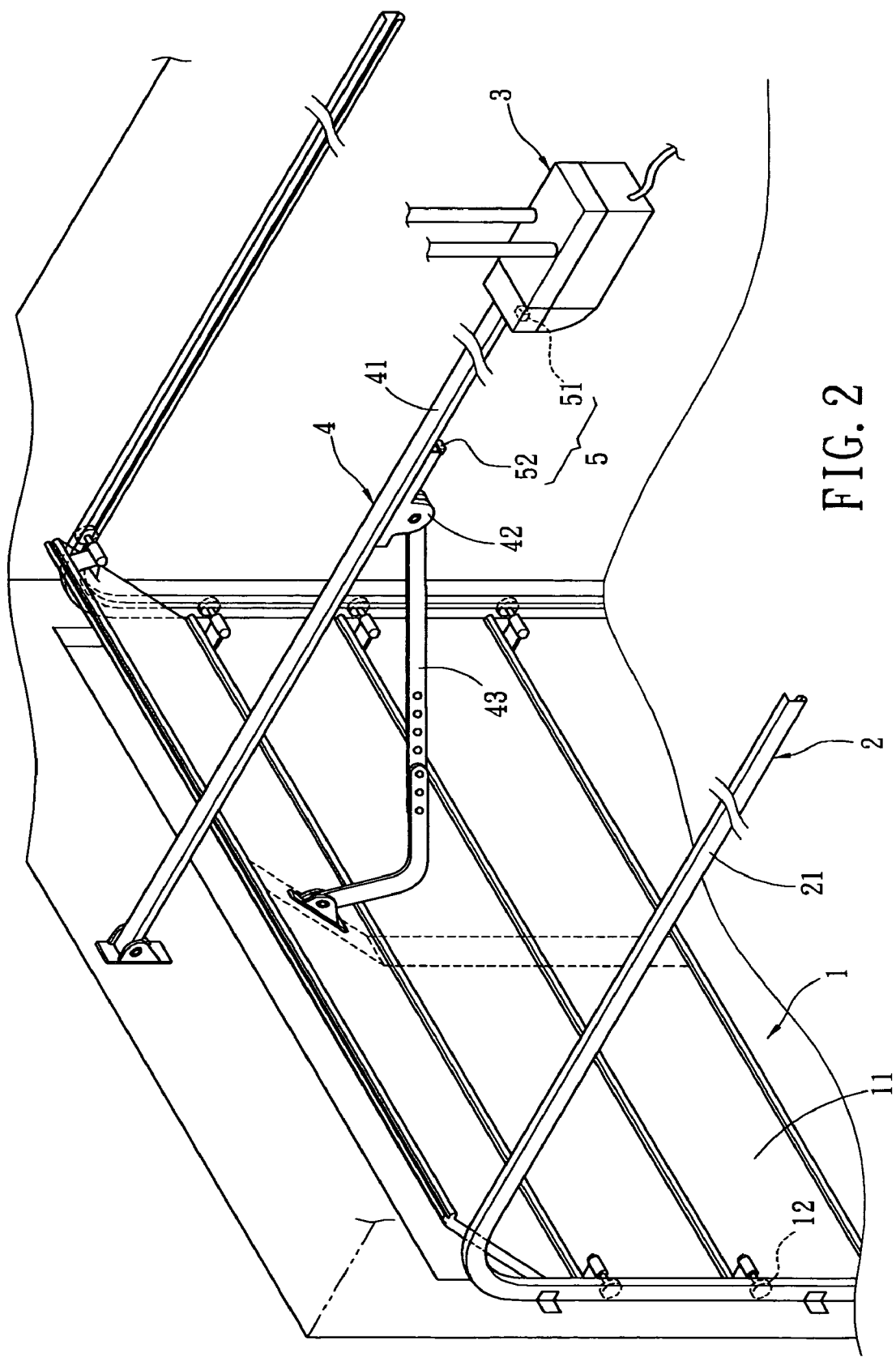
FIG. 2 is a perspective view for a preferable example for the invention.

Referring to FIG. 2, the safety garage door apparatus of the present invention includes a garage door 1, a pair of tracks 2, a controller 3, a linking device 4 and a detecting device 5.

The garage door 1 includes a plurality of plates 11 connected together. A plurality of rollers 12 are mounted on two sides of the garage door 1.

The L-shaped track 2 is installed beside each side of the garage door 1 so that the rollers 12 can move along the tracks 2 to have the garage door 1 open or close.

Figure 3:
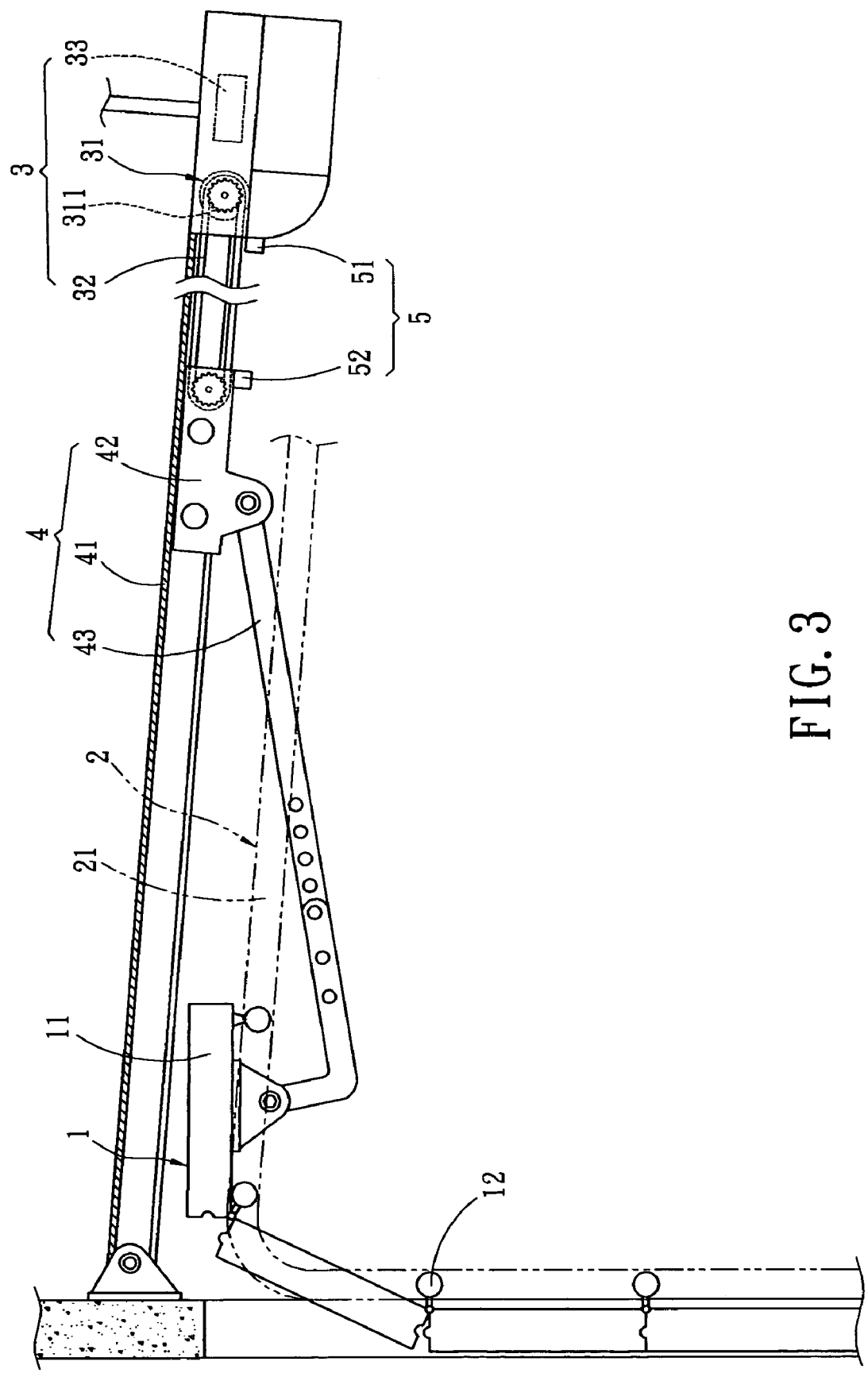
FIG. 3 shows a garage door apparatus of the invention in use.
Figure 4:
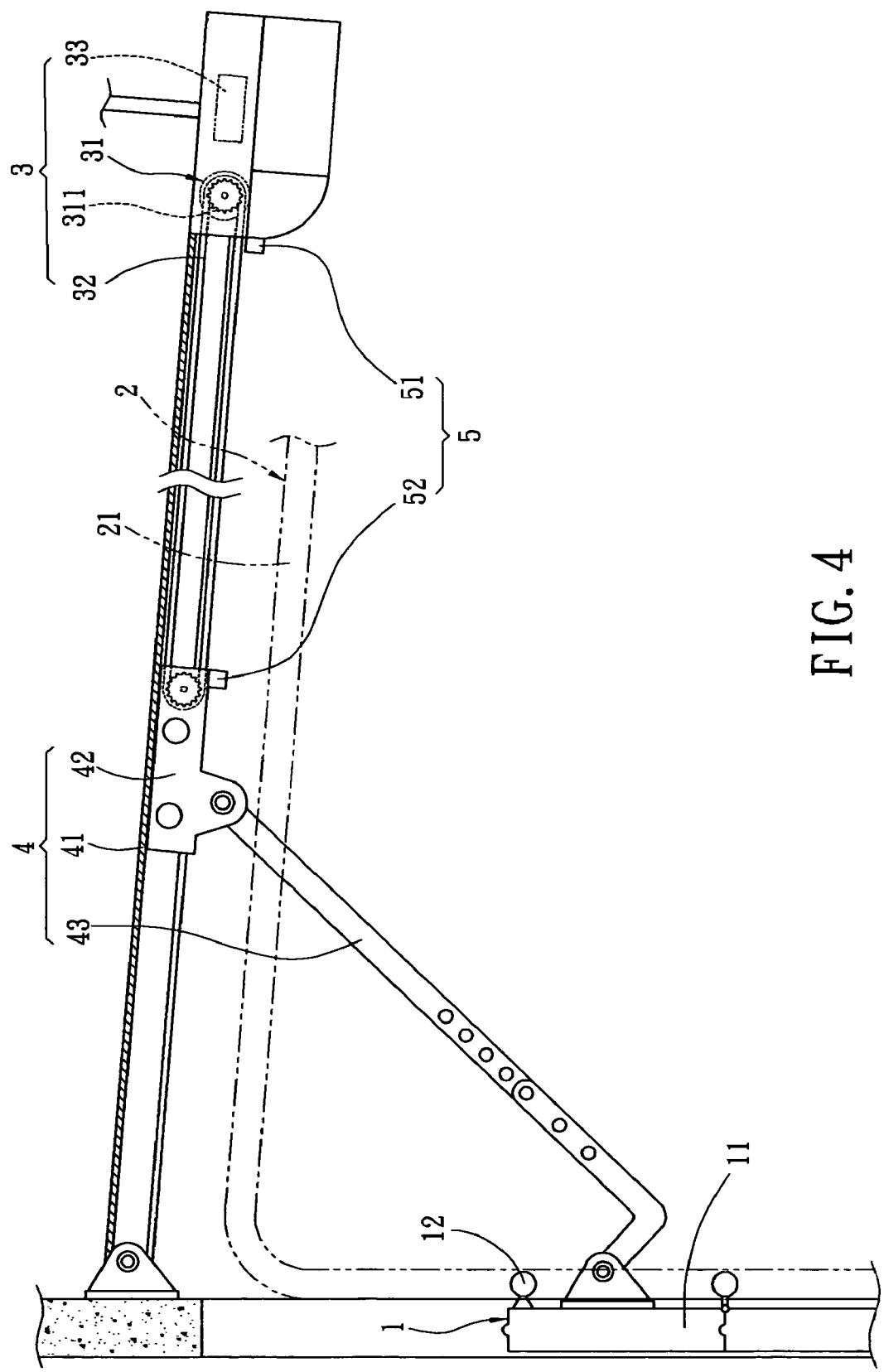
FIG. 4 shows a garage door apparatus of the invention in use.

The controller 3 for controlling the garage door 1 is fixed on the garage ceiling near the rear ends of the tracks 2. The controller 3 includes a motor 31, a driving device 32 connected to the motor 31 and a microprocessor 33, as shown in FIG. 3 or 4. The driving device 32 includes a gear 311 connected to the motor 31 and a chain, belt or cable connected to the gear 311 so that the motor 31 can drive the driving device 32 to pull the garage door 1 open through the linking mechanism 4.

The linking device 4 includes a rail 41, a rack 42 slidably mounted in the rail 41 and a linkage 43 with one end connected to one end of the rack 42 and the other end connected to the garage door 1. The other end of the rack 42 is then connected to the driving device 32.

The detecting device 5 includes a transmitter 51 and a receiver 52. The transmitter 51 is located on a front of the controller 3 and the receiver 52 is located on a rear of the rack 42 corresponding to the transmitter 51. The transmitter 51 can emit either a light wave or a sound wave to the receiver 52 and the receiver 52 will reflect the light wave or the sound wave back to the transmitter 51 to determine a distance of the rack 42 away from the controller 3 by the microprocessor 33. The light wave can be a laser or an infrared light. The sound wave can be a supersonic wave.

When the controller 3 makes the garage door 1 to close, the motor 31 is actuated to make the driving device 32 moving the rack 42 away from the controller 3. Meanwhile, the transmitter 51 continually emits the wave to the receiver 52 and the receiver 52 reflects the wave back to the transmitter 51 right away so that the location of the rack 42 can be detected at every moment. That is, according to the wave traveling between the rack 42 and the controller 3, a moving speed of the rack 42 can be calculated. This moving speed will be compared to a predetermined rate stored in the controller 3 by the microprocessor 33. Therefore, if the moving speed of the rack 42 is lower than the predetermined rate, the microprocessor 33 will send a signal to the controller 3 to stop or reverse the operation of the garage door 1 to prevent accidents.

Moreover, the moving speed of the rack 42 can be used to determine whether the maintenance is needed. That is, if the moving speed is lower than 5 cm/s, for example, the controller 3 can provide an alarm such as using flashing light or buzzer to show the user that it is the time to maintain the garage door.

This disclosure provides exemplary embodiments of the present invention. The scope of this disclosure is not limited by these exemplary embodiments. Numerous variations, whether explicitly provided for by the specification or implied by the specification, such as variations in shape, structure, dimension, type of material or manufacturing process may be implemented by one of skill in the art in view of this disclosure.

The invention claimed is:

1. A safety garage door apparatus, comprising:
   a garage door;
   two tracks installed on two sides of the garage door, respectively;
   a controller fixedly installed above the garage door, including a motor, a driving device connected to the motor, and a microprocessor;
   a linking device including a rail, a rack slidably mounted in the rail, and a linkage with one end connected to one end of the rack and the other end connected to the garage door, the other end of the rack being connected to the driving device; and
   a detecting device mounted in the controller to continually detect a location of the rack so that a moving speed of the rack is determined by the microprocessor to compare with a predetermined rate to determined whether an operation of opening or closing the garage door needs to be stopped or reversed, or a maintenance of the garage door apparatus is needed,
   wherein the driving device includes a gear connected to the motor and a chain, a belt or a cable connected between the gear and the other end of the rack.

2. The safety garage door apparatus according to claim 1, wherein the detecting device includes a transmitter located on a front of the controller, and a receiver located on a rear of the rack, a wave being emitted from the transmitter to the receiver and then reflected from the receiver back to the transmitter so that a distance of the rack away from the controller is determined to obtain the moving speed.

3. The safety garage door apparatus according to claim 2, wherein the wave is a light or a sound wave.

4. The safety garage door apparatus according to claim 3, wherein the light wave is a laser or an infrared light.

5. The safety garage door apparatus according to claim 3, wherein the sound wave is a supersonic wave.

6. A safety garage door apparatus, comprising:
   a garage door;
   two tracks installed on two sides of the garage door, respectively;
   a controller fixedly installed above the garage door, including a motor, a driving device connected to the motor, and a microprocessor;
   a linking device including a rail, a rack slidably mounted in the rail, and a linkage with one end connected to one end of the rack and the other end connected to the garage door, the other end of the rack being connected to the driving device; and
   a detecting device mounted in the controller to continually detect a location of the rack so that a moving speed of the rack is determined by the microprocessor to compare with a predetermined rate to determined whether an operation of opening or closing the garage door needs to be stopped or reversed, or a maintenance of the garage door apparatus is needed,
   wherein the detecting device includes a transmitter located on a front of the controller, and a receiver located on a rear of the rack, a wave being emitted from the transmitter to the receiver and then reflected from the receiver back to the transmitter so that a distance of the rack away from the controller is determined to obtain the moving speed.

7. The safety garage door apparatus according to claim 6, wherein the driving device includes a gear connected to the motor and a chain, a belt or a cable connected between the gear and the other end of the rack.

8. The safety garage door apparatus according to claim 6, wherein the wave is a light or a sound wave.

9. The safety garage door apparatus according to claim 6, wherein the light wave is a laser or an infrared light.

10. The safety garage door apparatus according to claim 6, wherein the sound wave is a supersonic wave.

* * * * *